United States Patent Office 3,557,070
Patented Jan. 19, 1971

3,557,070
PREPARATION OF ETHYLENE POLYMERS
Harry D. Anspon, Kansas City, Mo., and Bert H. Clampitt, Overland Park, and Ronald E. Gilbert, Shawnee Mission, Kans., assignors to Gulf Research & Development Company, Pittsburgh, Pa., a corporation of Delaware
No Drawing. Filed Dec. 28, 1967, Ser. No. 694,118
Int. Cl. C08f 27/00
U.S. Cl. 260—86.7          8 Claims

ABSTRACT OF THE DISCLOSURE

Ethylene-acrylate copolymers wherein the substituent acrylate groups are converted to the amide and acid form are obtained by the thermal decomposition of an ethylene-isopropyl ester of acrylic or methacrylic acid in an inert atmosphere which is followed by conversion of the anhydride in a second thermal reaction step to produce an ethylene-acrylic acid or ethylene-acrylamide-acrylic acid polymer.

BACKGROUND OF THE INVENTION

Ethylene-acrylamide-acrylic acid polymers can be prepared by a process disclosed in copending application Ser. No. 585,283 filed by B. H. Clampitt on Oct. 10, 1966. As disclosed in the copending application, an ethylene-alkyl acrylate or methacrylate polymer can be hydrolyzed by the action of an alkali metal hydroxide and a nitrogenous base such as ammonia at an elevated temperature to produce an ethylene-alkyl acrylate or methacrylate polymer wherein at least portions of the substituent acrylate groups are in alkali metal salt and amide form. The product of the hydrolysis process can then be subjected to an ion exchange step wherein the alkali metal cations are exchanged for ammonium ions by passing the hydrolysate through an ion exchange medium charged with ammonium ions. The resultant ammonium substituent groups are decomposed to produce an ethylene-acrylamide-acrylic acid polymer.

This process for the production of ethylene-acrylamide-acrylic acid polymers is necessarily relatively expensive in that a series of four reaction process steps (not to include product separation), each of which must be closely controlled, is required to prepare the desired polymer product. The cost of the product polymer could be substantially reduced if it were possible to eliminate or reduce the number of reaction steps employed to produce the product polymer.

Accordingly, an object of the invention is to provide an improved process for the preparation of ethylene-acrylamide-acrylic acid and ethylene-methacrylamide-methacrylic acid polymers.

Another object of the invention is to provide an improved process for the preparation of ethylene-acrylic acid-anhydride and ethylene-methacrylic acid-anhydride polymers.

A further object of the invention is to provide an improved process for the preparation of ethylene-acrylic and ethylene-methacrylic acids.

Other objects, advantages and features of the invention will be readily apparent to those skilled in the art from the following description and appended claims.

SUMMARY OF THE INVENTION

By the invention an ethylene-isopropyl ester of acrylic or methacrylic acid copolymer is heated to the ester decomposition temperature in an inert atmosphere to produce an ethylene-acrylic acid-anhydride, or in the case of a methacrylic ester an ethylene-methacrylic acid-anhydride, polymer. The product of this first thermal decomposition process step can then be heated to an elevated temperature in an ammonia atmosphere to convert the anhydride to the acid and the amide, thereby producing an ethylene-acrylamide-acrylic acid or ethylene-methacrylamide-methacrylic acid polymer. In a further embodiment of the invention the product of the thermal decomposition step is heated to at least 200° C. in the presence of steam, thereby converting the anhydride to the acid.

DESCRIPTION OF THE INVENTION

The ethylene copolymers comprising ethylene and the isopropyl ester of acrylic or methacrylic acid and which are thermally decomposed by the process of this invention can be prepared by conventional methods known to the art. A suitable method is described in U.S. 3,350,372 wherein it is stated that ethylene and an alkyl acrylate (to include the isopropyl ester of acrylic or methacrylic acid) are copolymerized at pressures of the order of 10,000–40,000 p.s.i. and at temperatures of at least 200° F. The polymerization reaction can be conducted in the presence of a free-radical polymerization initiator and in the absence of any added solvent other than for minor quantities of catalyst carrier or telogenating agents.

Free-radical polymerization initiators employed in the copolymerization process can be selected from those normally employed in the homopolymerization of ethylene, such as the organic peroxides, e.g., lauroyl peroxide, di-tertiary butyl peroxide, and tertiary butyl peracetate, an azo compound such as $\alpha,\alpha'$-azobisisobutyronitrile and $\alpha,\alpha'$-azobisethylisobutyrate. Typically the free-radical polymerization initiator will be dissolved in a suitable organic liquid such as benzene, mineral oil, or the like. Ordinarily, the free-radical initiator will be used at a level of the order of 50 to 20,000 p.p.m. or preferably 100–250 p.p.m. based upon the monomers charged to the reactor.

Although it is within the scope of the invention to employ ethylene-isopropyl acrylate ester copolymers with a wide range of molar ratios of combined ethylene and isopropyl ester, the copolymers employed in the thermal decomposition process will normally contain a maximum of 0.5 mol of isopropyl acrylate ester per mol of contained ethylene. Normally the copolymers will contain at least 1 mol percent of the isopropyl acrylate ester.

The ethylene-isopropyl acrylate or methacrylate copolymer is heated to the ester decomposition temperature in an inert atmosphere such as nitrogen or argon to obtain an ethylene-acrylic acid-anhydride or ethylene-methacrylic acid-anhydride polymer product. At atmospheric pressures, the ethylene-isopropyl acrylate or methacrylate copolymer is heated to a temperature of at least 325° C. Although some decomposition may occur at temperatures below 325° C., a complete decomposition of the ester groups in the polymer necessary to obtain the above defined polymer product results only after exceedingly long heating times. Therefore, substantially lower decomposition temperatures are not commercially feasible. The copolymer is maintained at the decomposition temperature until all of the ester groups have been decomposed. The time required to achieve complete thermal decomposition of the ester radical will depend upon the temperature, decreasing with increasing decomposition temperatures.

It will be understood by those skilled in the art that the decomposition temperature can be adjusted by varying the pressure under which the thermal decomposition process is performed. By employing superatmospheric pressures, decomposition temperatures above 325° C. are preferred while decomposition pressures substantially below atmospheric pressure will result in a somewhat lower decomposition temperature.

The relative proportion of the isopropyl ester which is decomposed to the anhydride form can be controlled by varying the temperature maintained in the thermal decomposition zone. Higher thermal cracking temperatures result in higher anhydride concentrations in the product polymer.

The product ethylene-acrylic acid-anhydride and ethylene-methacrylic acid-anhydride polymers produced by the thermal decomposition process of this invention have wide utility in those areas where ethylene-acrylic acid copolymers having controlled crosslinking characteristics are desired such as in the preparation of coatings, films and laminated structures to include safety glass.

In a second embodiment of the invention, the ethylene-acrylic acid-anhydride and ethylene-methacrylic acid-anhydride polymers produced by the above-described thermal decomposition process or by other processes known in the art can be subjected to a thermal anhydride conversion process step to convert the anhydride to the amide form. In this embodiment of the invention the ethylene-acrylic acid-anhydride and the ethylene-methacrylic acid-anhydride polymers are heated to an anhydride conversion temperature in an ammonia atmosphere. At atmospheric pressures, the ethylene-acid-anhydride polymer is heated to a temperature in the range of 200–250° C. Although some conversion may occur at temperatures below 200° C., a complete conversion of the anhydride groups in the polymer necessary to obtain an ethylene-acid-amide polymer can be obtained only after exceedingly long heating times. Therefore, substantially lower conversion temperatures are not commercially feasible. The polymer is maintained at the conversion temperature until all of the anhydride groups have been converted to the amide and acid form.

As in the case of the thermal decomposition of the ethylene-isopropyl ester polymer, it will be understood by those skilled in the art that the conversion temperature can be adjusted by varying the pressure under which the anhydride thermal conversion process step is performed.

In this thermal conversion step, the anhydride portion of the polymer is converted into equal molar portions of the acid and the amide. Thus, if in the thermal decomposition step two-thirds of the acrylate groups have been converted into the anhydride form, the thermal conversion process step would result in a product polymer wherein one-third of the original ester groups are converted to the amide form.

The product ethylene-acid-amide polymers of this invention can be employed in a variety of commercial applications, such as in the preparation of coatings and films where grease resistance is an important characteristic.

In a further embodiment of the invention, the ethylene-acrylic acid-anhydride and ethylene-methacrylic acid-anhydride polymers produced by the above-described thermal decomposition process or by other processes known in the art can be subjected to a thermal anhydride conversion process step so as to convert the anhydride to the free acid. In this embodiment of the invention the ethylene-acrylic acid-anhydride and the ethylene-methacrylic acid-anhydride polymers are heated to an anhydride conversion temperature in a water vapor (steam) atmosphere. At atmospheric pressures, the ethylene-acid-anhydride polymer is heated to a temperature of at least 200° C. Although some conversion may occur at temperatures below 200° C., a complete conversion of the anhydride groups to the free acid can be attained only after exceedingly long heating times. Therefore, substantially lower conversion temperatures are not commercially feasible. The polymer is maintained at the conversion temperature until all of the anhydride groups have been converted to the free acid. It will be understood by those skilled in the art that the conversion temperature employed in this embodiment of the invention can be adjusted by varying the pressure under which the anhydride thermal conversion process step is performed.

The product ethylene-carboxylic acid copolymers produced in this embodiment of the invention can be employed in coating applications and find particular utility in the preparation of safety glass laminates wherein the ethylene-acrylic or methacrylic acid copolymers are employed as the inner layer.

The objects and advantages of the invention are further illustrated by the following examples. It is not intended, however, that the invention should be limited to the specific embodiments presented therein.

EXAMPLE I

An ethylene-isopropyl methacrylate copolymer is heated at atmospheric pressure to the thermal decomposition temperature of 375° C. in a nitrogen atmosphere and the decomposition zone temperature maintained at this temperature until all of the ester groups are decomposed. The isopropyl methacrylate ester concentration of the feed copolymer is 19.3 weight percent.

Infrared analysis of the product polymer recovered from the thermal decomposition zone indicates that all of the ester groups have been converted to the acid and the anhydride form without causing degradation of the ethylene polymer chain. About 30 percent of the ester groups are converted to the free acid and the remainder to the anhydride.

EXAMPLE II

The process of Example I is repeated with the exception that a thermal decomposition temperature of 350° C. is employed. Infrared analysis of the product polymer recovered from the thermal decomposition zone indicates that all of the ester groups have been decomposed to the acid and anhydride form without substantial degradation of the ethylene polymer chain. About 40 percent of the ester groups are converted to the free acid and the remainder to the anhydride.

EXAMPLE III

The process of Example I is repeated with the exception that a thermal decompostion temperature of 400° C. is employed. Infrared analysis of the product polymer recovered from the thermal decomposition zone indicates that all of the ester groups have been decomposed to the acid and anhydride form without substantial degradation of the ethylene polymer chain. About 25 percent of the ester groups are converted to the free acid and the remainder to the anhydride.

EXAMPLE IV

The product of the thermal decomposition process of Example I is cooled and then heated at atmospheric pressure to a thermal conversion temperature of 255° C. in an ammonia atmosphere with the conversion zone maintained at this temperature until all of the anhydride groups are decomposed. Infrared analysis of the product polymer recovered from this second thermal conversion process step indicates that substantially all of the anhydride groups are converted to an equal mixture of acid and amide groups. The product polymer thus obtained contains about 65 percent of the acrylate groups in acid form and 35 percent in amide form.

EXAMPLE V

The thermal decomposition product of Example II is heated at atmospheric pressure to the thermal conversion temperature of 205° C. in an ammonia atmosphere with the conversion zone maintained at this temperature until all of the anhydride groups are decomposed. Infrared analysis of the product recovered from this second thermal conversion decomposition step indicates that about 70 percent of the ester groups have been converted to the free acid and 30 percent to the amide.

The intrinsic viscosity (ASTM D 1601–61 0.20 gram polymer/100 ml.), as measured in a 50–50 mixture of n-propanol and xylene, of the anhydride conversion polymer product is 0.448 at 99.5° C., the ultimate tensile strength (ASTM D 1708-66 Extension 1 inch/minute) is 1825 p.s.i., and the elongation is 270%. The intrinsic viscosity of the ethylene isopropyl methacrylate copolymer feed as measured in xylene at 99.5° C. is 0.629, the ultimate tensile strength is 900 p.s.i. and the elongation is 520%. From this it is readily apparent that tensile properties characteristic of the product acid polymer are substantially superior to the tensile properties of the polymer feed.

EXAMPLE VI

The thermal decomposition step of Example I is repeated with the exception that a thermal decomposition temperature of 380° C. is employed. The thermal decomposition product is cooled and then heated at atmospheric pressure in the presence of steam to a temperature of 210° C. and maintained at this temperature for a time sufficient to completely convert the anhydride to the free acid. Infrared analysis of the product indicates that the product polymer is an ethylene-methacrylic acid copolymer.

Although the invention has been described with reference to specific materials, embodiments and details, various modifications and changes, within the scope of this invention, will be apparent to one skilled in the art and are contemplated to be embraced in the invention.

We claim:

1. A process which comprises heating a normally solid ethylene-isopropyl ester of an acrylic or methacrylic acid copolymer to at least 325° C. in an atmosphere which is essentially inert, said copolymer containing a least 2 mols of ethylene per mol of ester, maintaining said copolymer at a temperature of at least 325° C. until substantially all of the ester groups have been decomposed, and recovering therefrom an ethylene-acrylic or methacrylic acid-anhydride polymer.

2. The process of claim 1 wherein the heating is conducted in a nitrogen atmosphere.

3. The process of claim 1 wherein said isopropyl ester is the ester of acrylic acid and the recovered polymer is an ethylene-acrylic acid-anhydride polymer.

4. The process of claim 1 wherein said isopropyl ester is the ester of methacrylic acid and the recovered polymer is an ethylene-methacrylic acid-anhydride polymer.

5. The process of claim 1 to include cooling and thereafter heating the ethylene-acrylic or methacrylic acid-anhydride polymer to an elevated anhydride conversion temperature of at least 200° C. in an atmosphere selected from the atmospheres consisting essentially of steam and recovering therefrom an ethylene-acrylic or methacrylic acid copolymer.

6. The process of claim 1 to include cooling and thereafter heating the ethylene-acrylic or methacrylic acid-anhydride polymer to an elevated anhydride conversion temperature in the range of 200 to 250° C. in the presence of ammonia and steam, and recovering therefrom an ethylene-acrylic acid-acrylamide polymer.

7. The process of claim 6 wherein said isopropyl ester is the ester of acrylic acid and the polymer recovered from the conversion step is an ethylene-acrylic acid-acrylamide polymer.

8. The process of claim 6 wherein said isopropyl ester is the ester of methacrylic acid and the polymer recovered from the conversion step is an ethylene-methacrylic acid-methacrylamide polymer.

References Cited

UNITED STATES PATENTS

| | | | |
|---|---|---|---|
| 2,675,359 | 4/1954 | Schneider | 260—2.1 |
| 3,078,260 | 2/1963 | Hayes | 260—83.5 |
| 3,132,120 | 5/1964 | Graham et al. | 260—78.5 |
| 3,244,679 | 4/1966 | Schroder et al. | 260—86.1 |
| 3,249,570 | 5/1966 | Potts et al. | 260—29.6 |
| 3,337,488 | 8/1967 | Lyons et al. | 260—29.6 |
| 3,337,517 | 8/1967 | Anspon | 260—86.7 |
| 3,350,372 | 10/1967 | Anspon et al. | 260—86.7 |
| 3,415,904 | 12/1968 | Taniguchi et al. | 260—897 |
| 3,429,860 | 2/1969 | Hurst | 260—86.7 |

JOSEPH L. SCHOFER, Primary Examiner

J. KIGHT, Assistant Examiner

U.S. Cl. X.R.

260—80.73